May 2, 1961

G. HIRS 2,982,412

FILTER APPARATUS

Filed Feb. 19, 1958

INVENTOR.
GENE HIRS.
BY
Wallace P. Lamb
ATTORNEY.

May 2, 1961    G. HIRS    2,982,412
FILTER APPARATUS
Filed Feb. 19, 1958    5 Sheets-Sheet 2
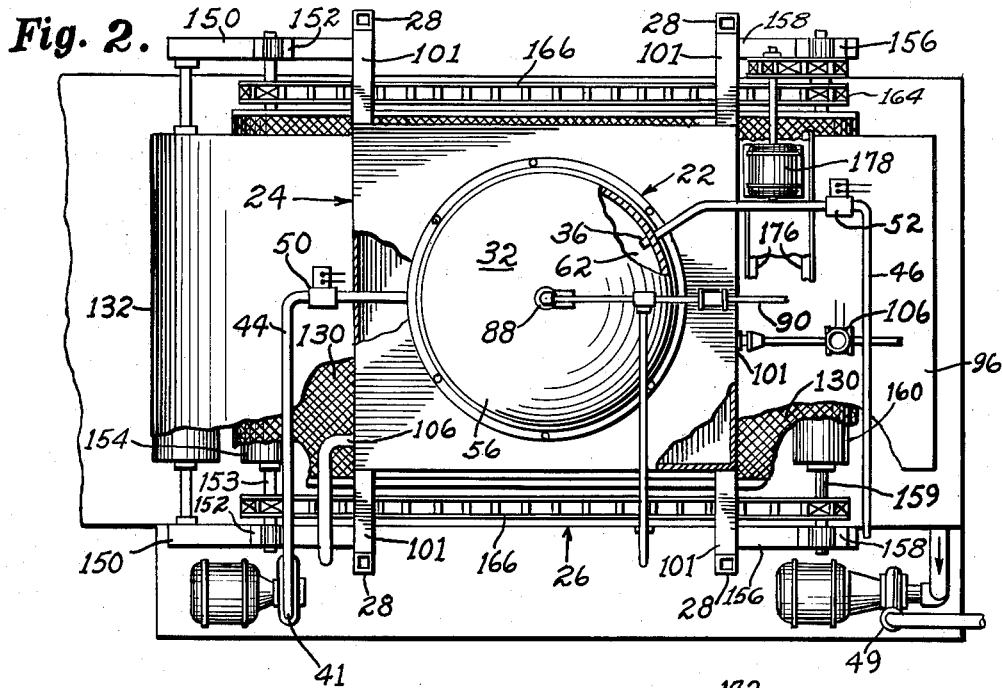
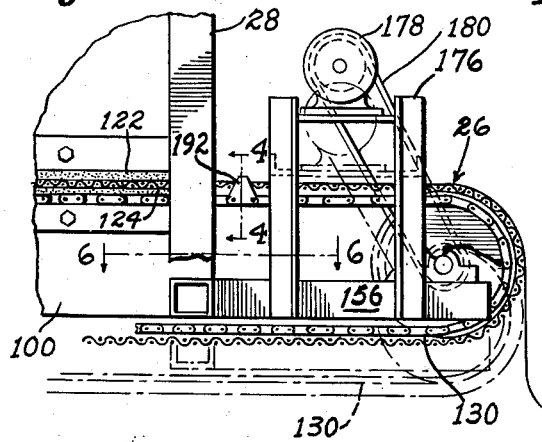
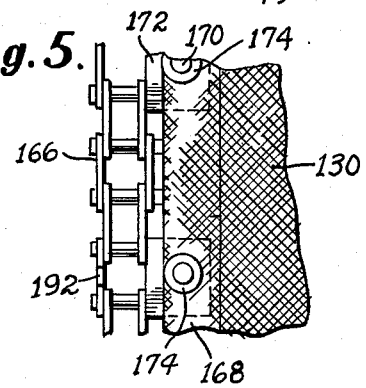
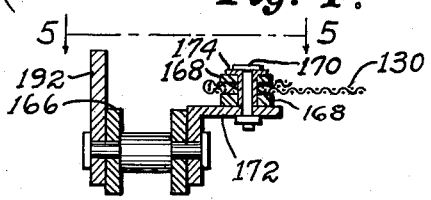
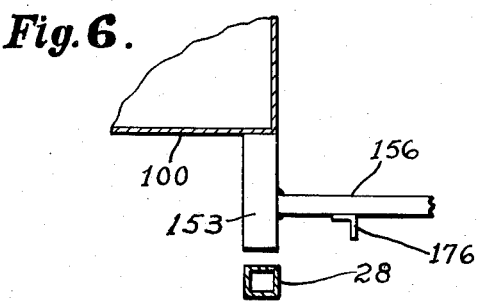
INVENTOR.
GENE HIRS.
BY
Wallace P. Lamb
ATTORNEY.

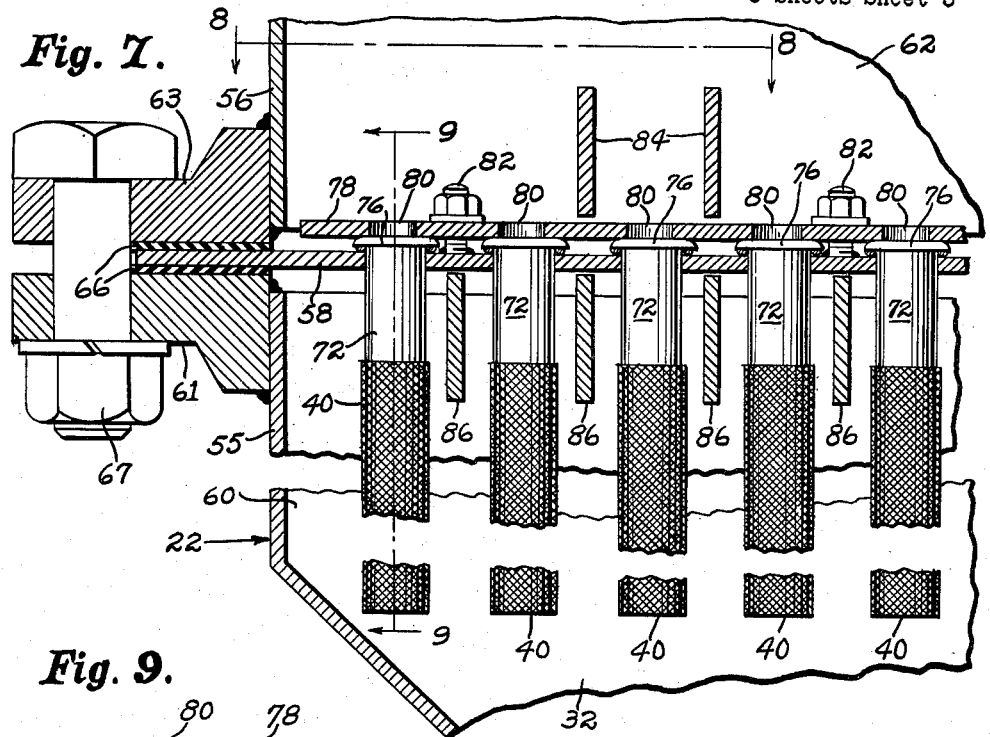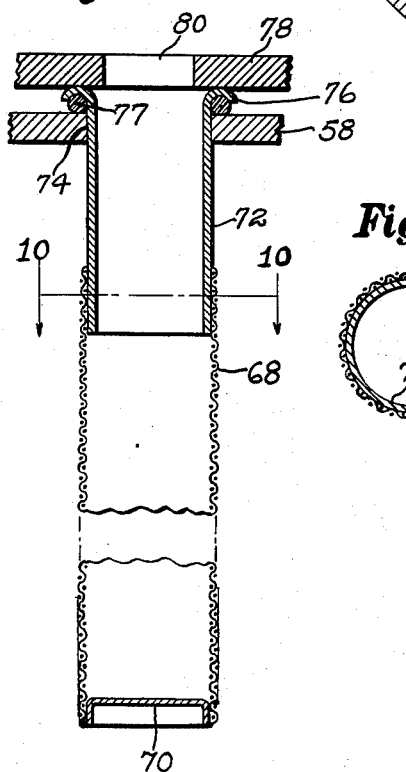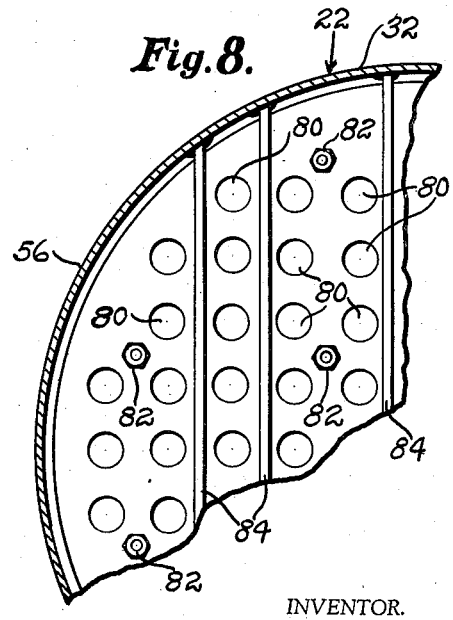

May 2, 1961
G. HIRS
2,982,412
FILTER APPARATUS
Filed Feb. 19, 1958
5 Sheets-Sheet 4
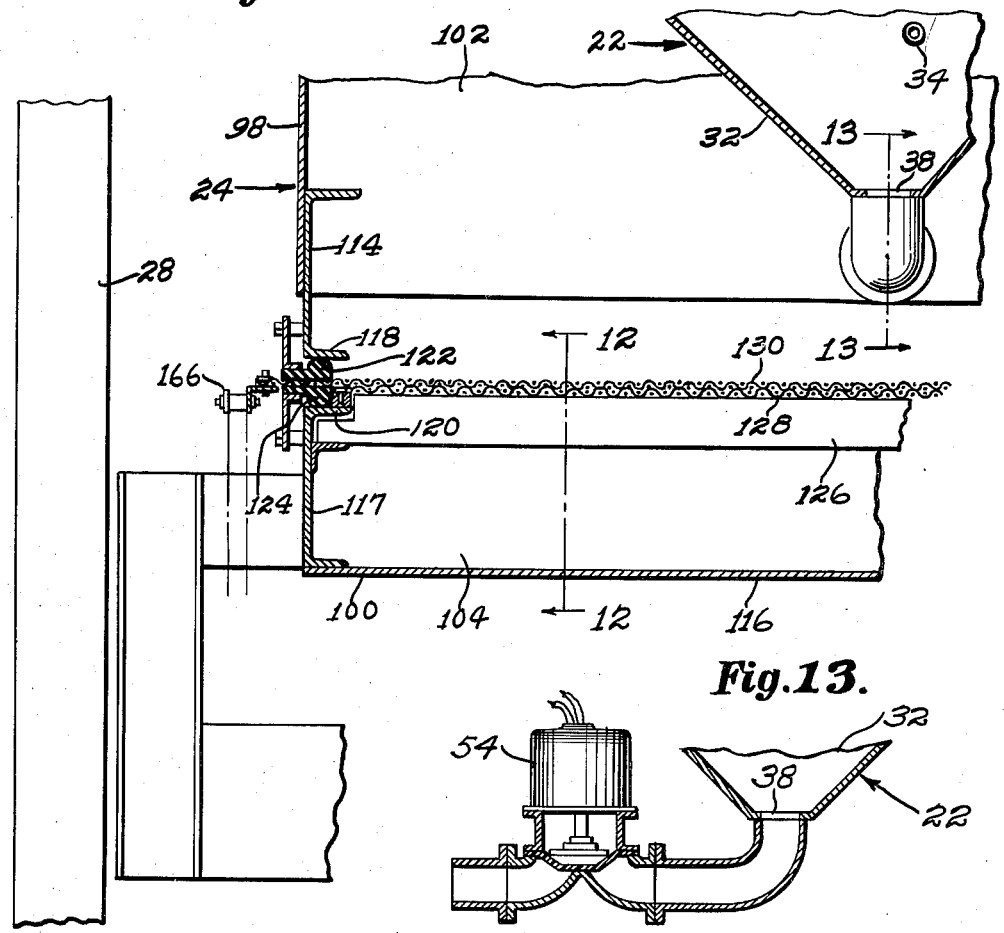
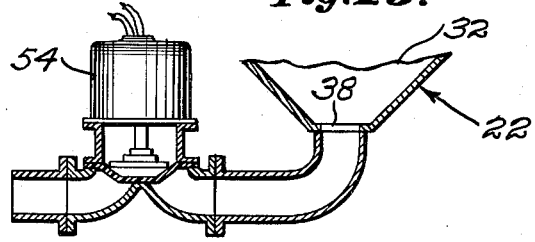
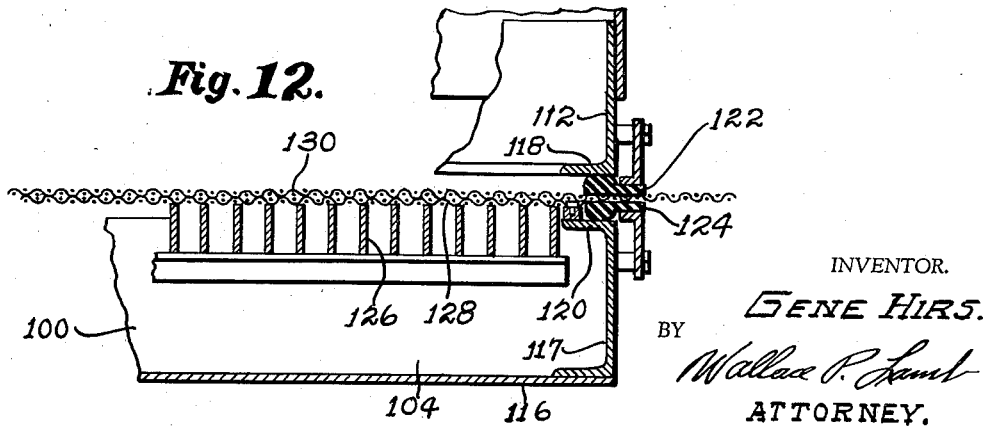
INVENTOR.
GENE HIRS.
BY
Wallace P. Lamb
ATTORNEY.

United States Patent Office 2,982,412
Patented May 2, 1961

2,982,412
FILTER APPARATUS
Gene Hirs, 17208 Greenview Road, Detroit, Mich.
Filed Feb. 19, 1958, Ser. No. 716,085
3 Claims. (Cl. 210—108)

This invention relates generally to filtering apparatus and particularly to high capacity liquid filtering apparatus.

It is an object of my invention to provide an improved liquid filtering apparatus of increased efficiency.

Another object of my invention is to provide an improved liquid filtering apparatus of a character such that foreign matter filtered from the liquid is periodically removed and filtering operation resumed without any appreciable loss of filtering time.

Another object of my invention is to provide a filter apparatus of the above mentioned character in which the operation of removing the foreign matter from the filter is accomplished without any appreciable loss of liquid.

Another object of the invention resides in the novel construction of a filter apparatus including primary and secondary filters.

A further object is to provide a control system which in response to pressure conditions in both heads of the filter apparatus controls cycling operation of the apparatus to remove foreign matter from the apparatus in such manner as to provide quick return of the primary filter to filtering operation.

Other objects of the invention will become apparent from the following detail description, taken in connection with the accompanying drawings in which:

Fig. 2 is a plan view having parts broken away and in section;

Fig. 3 is a fragmentary vertical sectional view of the apparatus including the discharge and drive end of a conveyor;

Fig. 4 is a cross sectional view taken along line 4—4 of Fig. 3;

Fig. 5 is a fragmentary plan view, taken in the direction of the arrows 5—5 of Fig. 4;

Fig. 6 is a horizontal sectional view taken along the line 6—6 of Fig. 2;

Fig. 7 is an enlarged fragmentary vertical sectional view, taken along the line 7—7 of Fig. 1;

Fig. 8 is a horizontal sectional view, taken along the line 8—8 of Fig. 7;

Fig. 9 is an enlarged vertical sectional view, taken along the line 9—9 of Fig. 7;

Fig. 10 is a cross sectional view, taken along line 10—10 in Fig. 9;

Fig. 11 is an enlarged vertical sectional view, taken along line 11—11 of Fig. 1;

Fig. 12 is a vertical sectional view, taken along line 12—12 of Fig. 11;

Fig. 13 is a vertical sectional view, taken along line 13—13 of Fig. 11; and

Figure 1:
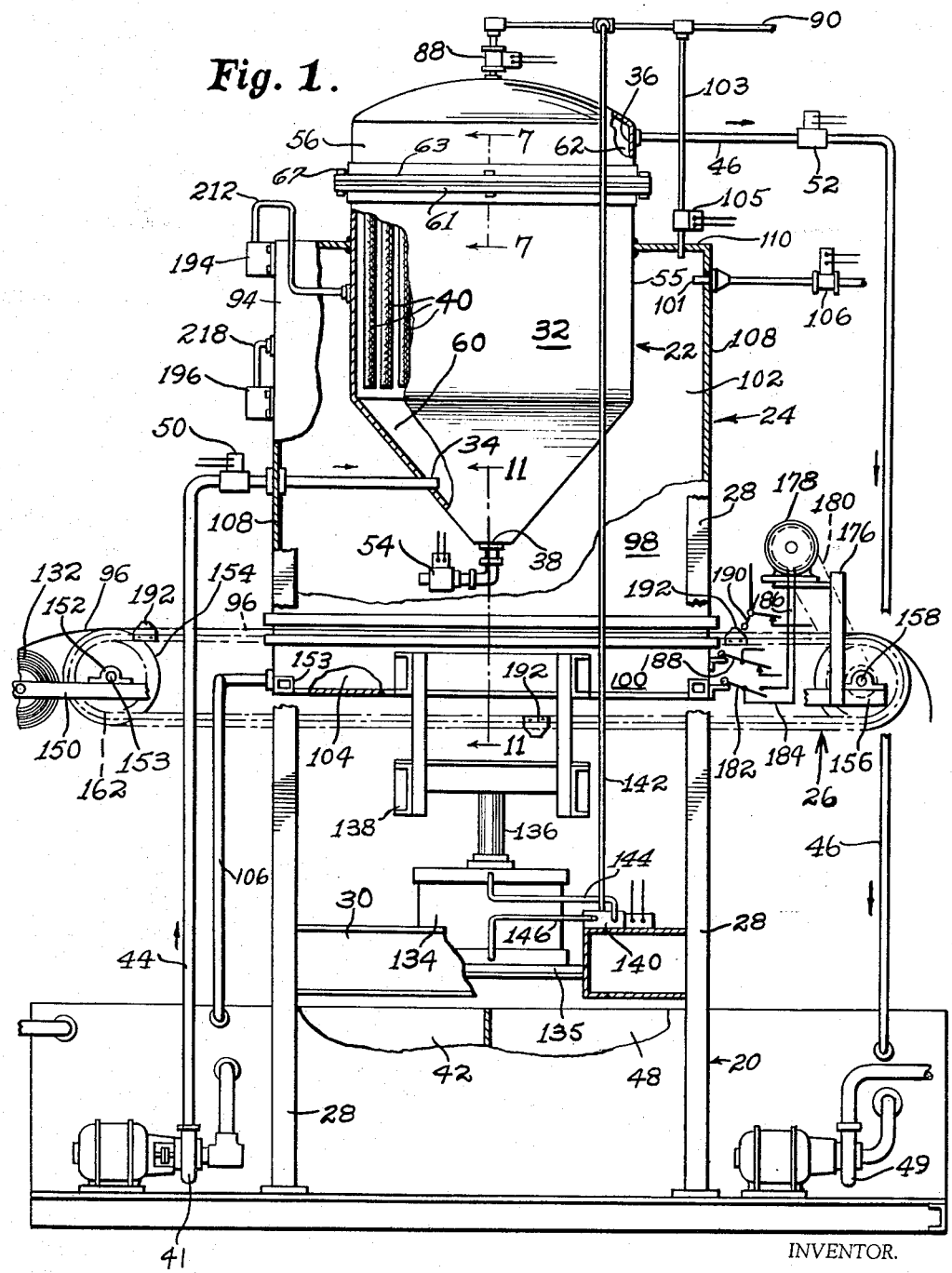
Fig. 1 is an elevational view of my filter apparatus having parts broken away and in section.

Referring to the drawings by characters of reference, my filter apparatus comprises, in general, a support or frame structure 20, a relatively small volume high capacity primary filter 22, a relatively large volume low capacity secondary filter 24, and a dirt removal conveyor 26. The filter 24 is mounted on the frame 20 and the filter 22 and conveyor 26 are both mounted on the filter 24, the filter 22 being directly above the conveyor 26.

Any suitable frame 20 may be used, the present frame comprising essentially four posts 28 which are spaced apart such that they form the corners of a rectangular frame. The posts 28 are rigidly connected together by cross members including a lower cross member 30. As shown in Figs. 1 and 2, side pairs of the posts 28 are spaced apart to clear the conveyor 26 which passes therebetween.

The filter 22 comprises a container 32 having an inlet 34 for liquid to be filtered, an upper outlet 36 for filtered liquid, and a lower outlet or discharge 38 for foreign matter filtered from the liquid. Disposed within the container 32 is a filter media comprising a plurality of individual filter elements or tubes 40 which are disposed between the container inlet 34 and outlet 36, the discharge 38 being on the same sides of the filter tubes as the inlet 34. Collectively, the filter tubes 40 present a large filter media to accommodate high capacity rate of filtration. In order to provide a high capacity filtering operation, a pump 41 is employed to deliver contaminated liquid to container 32 at a pressure in excess of atmospheric pressure. In the present disclosure, contaminated liquid is delivered to a tank 42 below conveyor 26 whence the pump 41 forces the liquid into container 32 through a supply pipe 44 that is connected to the container inlet 34. From the outlet 36, a pipe 46 conducts clean liquid from the container to a tank 48, whence the liquid may be delivered by a pump 49 to one or more points of use. A normally open solenoid valve 50 controls the inlet 34, another normally open solenoid valve 52 controls the outlet 36 and a third, but normally closed solenoid valve 54 controls the discharge 38. These valves have their positions automatically reversed in connection with a cleaning operation of container 32 which is hereinafter described in detail.

The filter container 32 is preferably cylindrical in shape and constructed of two secured together sections including a lower relatively large section 55 and an upper relatively small section 56. Separating the opposed ends of the container sections 55 and 56 is a plate 58 which divides container 32 into a lower filter chamber 60 and an upper outlet chamber 62. Carried by and depending from the plate 58 into filter chamber 60 are the filter medium tubes 40 which can be arranged in staggered relation so that a large number of tubes can be contained within the filter chamber 60. An outer margin of the plate 58 around the entire periphery thereof is held between annular flanges 61 and 63 respectively of the container sections 55 and 56, and gaskets 66 are displaced on tightening down nuts 67 to provide a fluid tight joint between the container sections.

The filter tubes 40 may each comprise a fine, wire mesh body 68 of cylindrical shape having the lower end thereof reinforced by a metal cap 70 and the upper end reinforced by an open ended metal sleeve 72. The sleeves 72 extend respectively through holes 74 in plate 58 and each sleeve is provided on its upper end with an annular flange 76. Beneath each of the flanges 76 is a gasket 77 which seats on the upper surface of plate 58. A clamping plate 78 rests on the flanged upper ends of the sleeves 72 having holes 80 aligning with sleeves 72 to establish communication between chamber 60 and 62 by way of the filter screen tubes 40. The clamping plate 78 is drawn down toward plate 58 by nuts on studs 82 that are welded to plate 58, as indicated. The clamping plate 78 thus displaces the gaskets 76 to seal the joints between the sleeves 72 and plates 58 and 78 so that all of the contaminated liquid must pass through the filter screens to flow to the outlet chamber 62. Above and below the plates 58 and 78, in close proximity thereto, is a number of spaced horizontal reinforcing ribs 84 and 86. The upper ribs 84 have their opposite ends welded to the side of the upper section 56 of container 32 and similarly, the lower ribs 86 have their opposite ends welded to the side of the lower section 55 of the container. These ribs 84 and 86 not only reinforce the container sections 55 and 56 in the regions of their opposed ends, but also reinforce plates 58 and 78 against undue deflection under the high pressures developed in the container. In this regard, it will be seen in Fig. 7 that the longitudinal edges of ribs 84 and 86 are respectively in close proximity to the opposite surfaces of the plates 58 and 78.

As is well known, filter media becomes clogged with foreign matter which reduces the filter rate and must be removed if high filtering efficiency is to be maintained. Removal of the foreign matter requires a shut-down period which in the past was of necessity of such long duration as to appreciably decrease filtering efficiency. In the filter apparatus embodying my present invention, the above mentioned shut-down period for all practical purposes has been eliminated as the shut-down period has been reduced to an interval substantially equal to the period required to discharge all of the foreign matter from filter 22 into filter 24, an interval having no appreciable effect on the efficiency of the filtering operation. To this end, I provide, on shut down of the filter operation, for effecting a reverse flow and back pressure through head 32 to quickly discharge all of the foreign matter and unfiltered liquid from the discharge 38 of container 32. This may be accomplished by introducing compressed air into the outlet chamber 62 under control of a normally closed solenoid valve 88. An air line 90 leading from a source of compressed air connects to the top of filter container 32. It will be seen that air introduced into outlet chamber 62 will flow counter to flow of liquid during filtering and as a consequence will dislodge substantially all of the foreign matter from the filter tubes 40, the air pressurizing the container 32 and forcing the foreign matter and unfiltered liquid to the only outlet open at the time, namely, discharge 38. Air introduced into the container 32 to effect a blow-down will result in there being a pressure in the container in excess of atmospheric pressure until all of the liquid and foreign matter has been discharged and air escapes from discharge 38 whereupon the pressure will decrease. As shown, a lower portion of the filter container 32 is preferably conically shaped, tapering downwardly to the discharge 38 to induce evacuation of the dirt, sludge, etc. from the container. In instances where the liquid being filtered is not of great value, such as water, the discharge 38 may be connected directly to a sewer. However, where expensive liquids, such as fine cutting oils, chemicals, pharmaceuticals, etc. are filtered, the unfiltered liquid in chamber 60 at the shut-down time may be saved by discharging it into the filter 24.

The relatively large filter 24 includes a container 94 and a filter media 96. In order to provide for removal of the foreign matter from container 94, the container is constructed of two separable sections including an upper fixed section 98 and a lower vertically movable section 100. Structural members 101 are welded to the upper container section 98 and to the frame posts 28 to rigidly mount the container section on the frame. The filter media 96 extends horizontally through container 94 between the container sections 98 and 100, the media 96 cooperating with upper section 98 to provide a filter chamber 102 and with lower section 100 to provide a drain chamber 104. By this arrangement, the unfiltered liquid draining into outlet chamber 104 may be saved and returned to the tank 42 by means of a return pipe 106. The inlet to the drain or filter chamber 102, as previously mentioned, is the discharge 38 from filter 22.

Following the discharge of the foreign matter from discharge 38 into filter chamber 102, the latter is pressurized to expedite filtration through filter medium 96. This may be accomplished by introducing air under pressure into chamber 102 from a branch line 103 of main air line 90 under control of a normally closed solenoid valve 105. It will be understood that an air pressure greater than atmospheric pressure will be maintained on the head of unfiltered liquid in chamber 102 until all of the liquid has been discharged into lower chamber 104. An air vent 101 is provided for chamber 102 and is controlled by a normally closed solenoid valve 106.

The filter container 94 may be box-shaped having upright walls 108 and a top wall 110. A reinforcing frame extending into the lower end of upper section 98 and around the four walls 108 thereof is constructed of channel structural members 114 arranged with their webs upright and welded flat against the inner surfaces of walls 108. A similar reinforcing frame having a bottom plate 116 welded to the lower flanges of channel members 117 provides the lower section 100 of the container. The opposed flanges, as at 118 and 120 respectively of sections 98 and 100 provide excellent seating surfaces for a pair of gaskets 122 and 124, secured to said flanges.

Within the lower container section 100 is a grate-like supporting structure 126 which may be welded to section 100, the upper edges of the grate members being in substantially the same horizontal plane as the gasket seating flanges 120 of the lower section 100. A heavy screen 128 which overlies and is attached to the upper end of section 100 is supported by the grate 126 and in turn supports the upper lead side of a liquid pervious belt 130 of conveyor 26. The belt 130 may be made of any suitable material, such as, nylon or other pliable material. The belt 130 carries and is covered by the filter media 96 which may be a paper filter medium feeding onto the feed end of the belt 130 from a supply roll 132. When the lower container section 100 is in its normal raised position shown, the gaskets 122 and 124 grip the filter paper 96 and the belt 130 and are displaced to provide a fluid tight joint.

A power element or air cylinder 134 may be used to raise and lower the container section 100 and to hold the gaskets 122 and 124 compressed in the normally closed position of the container section. The air cylinder 134 may be mounted on a platform 135 constructed on the lower frame cross members 30 and includes the usual cylinder wherein a pist (not shown) carries a connecting rod 136. A yoke 138 rigidly connects the connecting rod 136 to the container section 100, the yoke 138 straddling the conveyor and container section 100. This yoke may be fabricated by welding channel structural members together, and arms of the yoke 138 may be welded to the side channel members of the container section 100.

A solenoid valve 140, connected by a branch line 142 to the air line 90 controls operation of the cylinder 134. A branch pipe 144 connects the solenoid to the upper end of cylinder 134, and a similar branch pipe 146 connects the solenoid 140 to the lower end of the cylinder 134. Normally, or during filtering operation, the solenoid 140 establishes connection between the source of compressed air and the lower end of cylinder 134 to hold the lower container section 100 in its raised or closed position.

The conveyor 26 is carried by the movable section 100 of the container 94 and thus moves with said section as the container is opened and closed. It will be apparent that it is the function of the conveyor 26 to remove the foreign matter from container 94 and replace the filter media therein during the period that the container is open. At the feed end of conveyor 26, laterally spaced extensions 150 welded to the lower container section 100 carry aligned mountings 152 which support a shaft 153 for a guide or spool 154 about which the belt 130 is guided, the belt as shown being of the endless type. Similarly, the discharge end of the conveyor 26 has a pair of laterally positioned extensions 156 which are welded to spacers 157 which in turn are welded to container section 100 and carry mountings 158 for a shaft 159 on which a spool 160 is provided to guide the belt 130. Fixed to the outer ends of shaft 153 is a pair of sprockets 162 and fixed to shaft 159 is a like pair of sprockets 164. Around the corresponding pairs of the sprockets 162 and 164 travel chains 166 to which the belt 130 is attached for travel therewith.

Opposite edges of the belt 130 are preferably bound and reinforced by double thicknesses of a closely woven fabric, such as canvas strips 168, sewn to margins of the belt proper (see Fig. 4). The belt 130 may be attached at spaced intervals along its bound edges to the chains 166 by any suitable fasteners, such as small bolts and nuts 170 shown. At suitable distances along the chains 166, links thereof have inturned horizontal flanges 172 to which the belt is attached. Preferably, eyelets 174 are fastened in and to the bound edges of the belt to receive the bolts and reinforce the canvas binding the areas of the bolts.

Carried by the conveyor extensions 156 is a support or mounting 176 for an electric motor 178 which when energized drives the conveyor 26 to remove the foreign matter from container 94. The mounting 176 is a fabricated structure which may be welded or otherwise secured to the extensions 156 and extends up and over or straddles the conveyor belt 130. In conventional manner, the motor 178 drives through a speed reducer (not shown) and drive belt or chain 180 to drive the shaft 158.

The conveyor motor 178 is energized or started in response to predetermined opening movement of container section 100 so as to insure that the conveyor will never be operated when the head is closed. A switch 182 having its contacts connected by leads 184, 186 to motor 178 is normally open and allowed to close on predetermined opening movement of lower container section 100. A similar, but normally closed switch 188 opens when the container 94 opens, the function of switch 188 being hereinafter fully described in connection with the description of the circuitry of Fig. 14. Another, and normally closed switch 190 is actuated in response to a predetermined distance of travel of conveyor belt 130 to deenergize conveyor motor 178. That is, the conveyor is stopped after the belt 130 has moved a distance such that the foreign matter has been removed from container 94 and, of course, a clean piece of the paper filter medium 96 has been moved into the container. To open switch 190 at the proper time, one of the conveyor chains 166 may carry spaced, cam-like actuators 192. As will be later more fully understood, the opening of switch 190 breaks a holding circuit of motor 178.

It will be understood that the filter 22 of my apparatus has a relatively long filtering period which is interrupted for a short period when the pressure in the filter 22 increases due to clogging of the filter media to a pressure indicating a need for the filter cleaning operation. At the preselected pressure, a pressure responsive control or switch 194 initiates a cycling operation to clean and return filter 22 quickly to filtering operation and in a somewhat longer period filter and remove the foreign matter from filter 24 and return the latter filter to normal operation before filter 22 again requires cleaning. The control system includes a second pressure responsive control or switch 196 that responds to changes in pressure in chamber 102 of filter 24 in the control of the apparatus.

Figure 14:
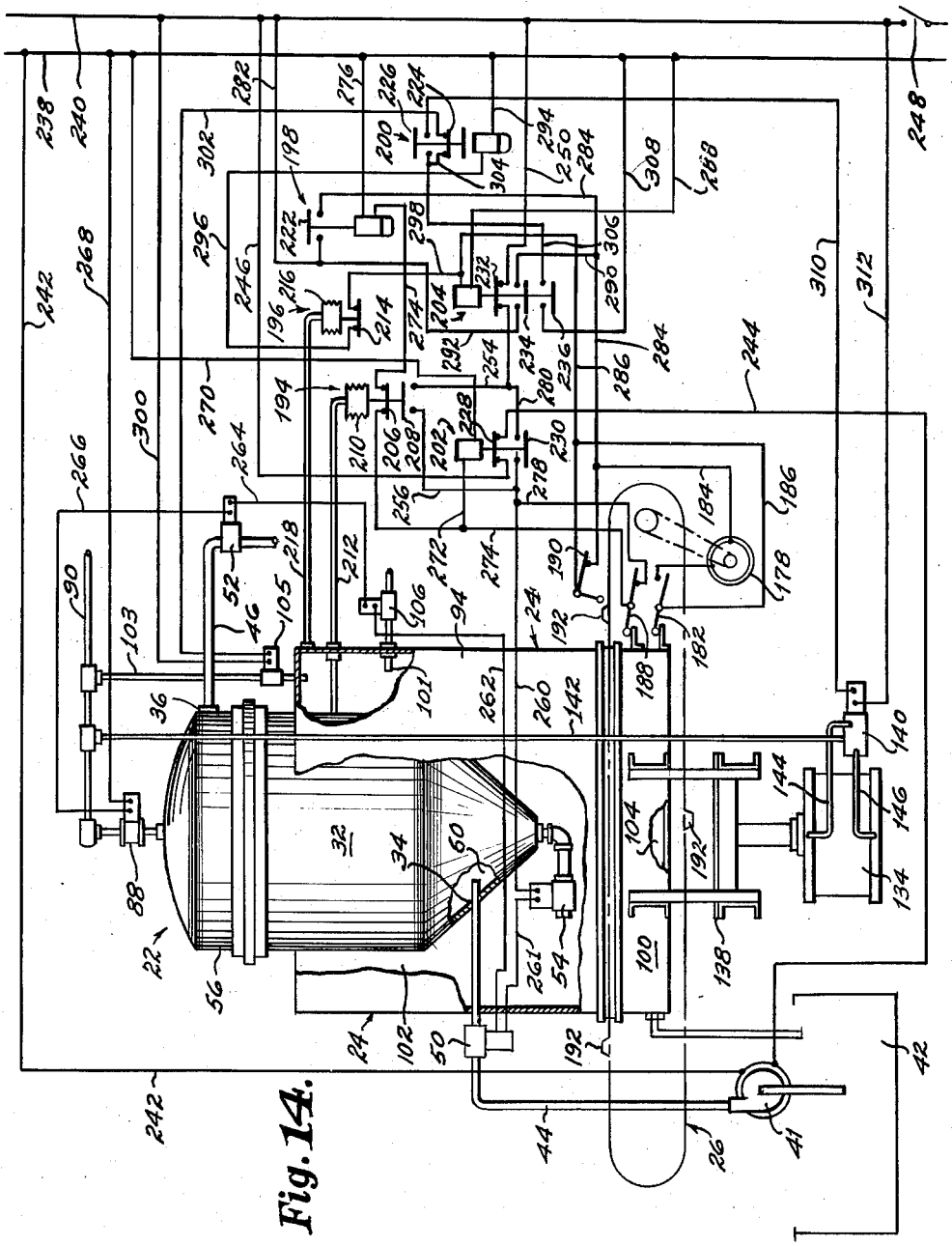
Fig. 14 is a diagrammatic view of the filter apparatus including its electrical controls and circuitry therefor.

Referring particularly to Fig. 14, the control system includes a delayed action control or switch 198, a second delayed action control or switch 200, a relay 202, and a second relay 204. The pressure responsive control 194 is diagrammatically represented as comprising a normally closed switch 206 and a normally open switch 208, the movable contacts of which are actuated by a pressure responsive element or bellows 210 that is connected by a conduit 212 to chamber 60 of filter 22. Similarly, the pressure responsive control 196 comprises a switch 214 that normally is closed and is connected to a bellows 216 which is communicatively connected by a conduit 218 to chamber 102 of filter 24. The delayed action relay 198 includes a normally closed switch 220 and a normally open switch 222 actuated by the usual coil. Similarly, the delayed action control 200 includes a normally closed switch 224 and a normally open switch 226, actuated by the delayed acting coil shown. Relay 202 is the well known type having in this instance two switches including a normally closed switch 228 and a normally open switch 230. Relay 204 is similar to relay 202, but has three switches including a normally closed switch 232, and two normally open switches 234 and 236.

With respect to the electrical circuitry, the numerals 238 and 240 designate the main electric power lines. From line 238, a lead 242 connects to one terminal of the motor that drives pump 41, and from the other terminal of said motor, a lead 244 connects to a fixed contact of relay switch 228 which has its other fixed contact connected by a lead 246 to the other main line 240. Thus, since switch 228 is normally closed, pump 41 operates continuously during the filtering operation providing, of course, that main line switch 248 is closed.

A lead 250 from main line 240 connects to one of the fixed contacts of relay switch 232 and a lead 252 connects the other fixed contact of switch 232 to one of the fixed contacts of pressure switch 208. From the other fixed contact of pressure switch 208, a lead 256 connects to a lead 260 which connects to one terminal of the discharge control solenoid 54. The solenoid 54, inlet solenoid 50, air vent solenoid 106, return line solenoid 52, and the air blow-down solenoid 88 are connected serially and to main line 238 by interconnecting leads 261, 262, 264, 266 and 268. This circuit is energized when the pressure in the filter head 32 increases to a predetermined pressure that will close the pressure switch 208. Relay 202 is also energized when pressure switch 194 closes, the coil of relay 202 being connected by a lead 270 to the main lead 238 and by a lead 272 to a lead 274 that connects one fixed contact of pressure switch 206 to limit switch 188. The other fixed contact of pressure switch 206 is connected by a lead 274 to one end of the coil of delayed action control 198 which has its other end connected by a lead 276 to main line 238. The limit switch 188 has a fixed contact connected by a lead 278 to lead 260 which is also connected to one of the fixed contacts of relay 230. The other fixed contact of relay switch 230 is connected to lead 254 by a lead 280 which in part provides the following holding circuit for relay 202: From main line 240 through leads 250, 280, relay switch 230, lead 278, limit switch 188, leads 274, 272, coil of relay 202, and lead 270 to the other main line 238.

The delayed action switch 222 has one of its fixed contacts connected by a lead 282 to the main line 240 and the other fixed contact connected by a lead 284 to the fixed contact of the conveyor actuated limit switch 190. A lead 286 connects the movable contact of limit switch 190 to one end of the coil of relay 204 which has the other end of its coil connected by a lead 288 to the other main line 238. A lead 290 connects one of the fixed contacts of relay switch 234 to lead 284, and a lead 292 connects the other of the fixed contacts to lead 282 and thus to main line 240. One end of the coil of delayed action relay 200 is connected to main line 238 by a lead 294 and the other end of the coil is connected by a lead 296 to one of the fixed contacts of pressure responsive switch 214. The other of the fixed contacts of pressure switch 214 is connected by a lead 298 to lead 286 and thus through limit switch 190, lead 284, switch 222 and lead 282 to main line 240.

A lead 300 from main line 240 connects to one of the terminals of the air blow-down solenoid 105 which has the other terminal connected by a lead 302 to one of the fixed contacts of switch 224 of the delayed action control 200. The other fixed contact of switch 224, connects by leads 304 and 306 to one of the fixed contacts of relay 236 which has its other fixed contact connected by a lead 308 to main line 238. Leads 304 and 306 also connect to one of the fixed contacts of delayed switch 226 and from the other fixed contact a lead 310 connects to one terminal of solenoid 140 which has its other terminal connected to main line 240 by a lead 312.

General description of operation

In general, my liquid filter apparatus operates as follows: Assuming that line switch 248 is closed and the several controls are in their normal position shown, the pump delivers liquid to be filtered from tank 42 to filter 22 wherein the liquid is filtered under the pressure created by pump 41 and the clean liquid is delivered by pipe 46 to tank 48. When the filter media in filter 32 clogs such that the resultant back pressure reaches a predetermined pressure, the discharge valve 54 is automatically opened and the filter pressurized to discharge the foreign matter and unfiltered liquid into filter 24 whereupon filter 32 quickly returns to filtering operation. Following the discharge of the foreign matter from filter 22 into filter 24, the latter is pressurized to force drainage of the unfiltered liquid through the filter media 96 for return to tank 42. The container of filter 24 is then automatically opened and conveyor 26 operates to remove the foreign matter from the container and replace the filter media therein. The conveyor 26 then stops and the container of filter closes before the inner filter 32 again discharges its foreign matter and unfiltered liquid into filter 24.

Detail description of operation

The control devices and other operable and moving parts of the apparatus are in their normal positions, or positions which they asume during the filtering operation. Assuming again that line switch 248 is closed, pump 41 will be operating, since relay switch 228 is closed, and the pump will deliver liquid to be filtered from tank 42 through supply pipe 44 to the filter container 32. As previously mentioned, the capacity of pump 41 is such that the liquid completely fills the filter 22 and is maintained under a pressure in excess of atmospheric pressure to provide a high rate of filtration. The liquid passes into filter chamber 60 through the normally open inlet 50 and then through the filter media tubes 40 where foreign matter is filtered out of the liquid. Passing through the filter tubes 40, the clean liquid flows into the outlet chamber 62 of container 32 from which the liquid flows through the normally open outlet valve 52 and is then conducted by pipe 46 to the clean liquid storage tank 48.

The foreign matter filtered from the liquid by the filter tubes 40 eventually clogs the filter media with accompanying increase in liquid pressure in filter chamber 60 and when this pressure reaches a predetermined pressure at which it is calculated that the filter tubes 40 require cleaning, pressure responsive control 194 is actuated. This opens pressure switch 206 and closes pressure switch 208. The opening of pressure switch 206 has no immediate effect other than to delay energization of the coil of delayed action relay 198, but the closing of pressure switch 208 initiates an automatic cycling operation of the apparatus to effect the cleaning out of both filters 22 and 24 and the returning of filter 22 immediately to filtering operation. The closing of pressure switch 208 closes the circuit of solenoids 54, 50, 106, 52 and 88, and also closes the circuit of relay 202. Closing of the circuit of solenoids 54, 50, 106, 52 and 88 reverses these valves such that the discharge solenoid 54, and solenoids 106 and 88 are opened and solenoids 50, 52 are closed. The circuit of these solenoid valves is as follows: From main power line 240, through lead 250, the closed switch 232, lead 254, the now closed pressure switch 208, leads 256, 260, solenoid 54, lead 261, solenoid 50, lead 262, solenoid 106, lead 264, solenoid 52, lead 266, solenoid 88 and through lead 268 to the other main power line 238. Simultaneously with the closing of the above traced circuit, the circuit of relay 202 is closed, the relay circuit being as follows: From main line 240, through lead 250, relay switch 232, lead 254, the now closed switch 208, lead 256, lead 278, limit switch 188, leads 274, 272, relay 202, and lead 270 to the other main line 238. The energizing of relay 202 opens the relay switch 228 and closes the relay switch 230. The opening of switch 228 opens the circuit of the motor of pump 41 to stop the pump, and the closing of switch 230 provides a holding circuit for relay 202 as pressure switch 206 opens when the pressure decreases in filter 22. The circuit of the motor of pump 41 is as follows: From the main power line 240, through lead 246, relay switch 228, lead 244, the motor of pump 41, and lead 242 to the other main power line 238.

When the electrical circuit of the solenoids 54, 50, 106, 52 and 88 closed, the solenoid 88 opened which introduced compressed air into the top of the filter 22 for the purpose of blowing air in reverse direction to liquid flow to backwash and flush all foreign matter from the filter tubes 40 and pressurize the filter container 32 to force all of the foreign matter out of the now open discharge solenoid 54 into filter head chamber 102. When about all of the foreign matter and unfiltered liquid has been discharged from filter chamber 60, the air then flows from the discharge and as a consequence the air pressure in chamber 60 falls. When this happens, the pressure responsive control 194 responds to the decreased air pressure closing its switch 206 and opening its switch 208. The opening of switch 208 has no effect on the circuit of the solenoids 54, 50, 106, 52 and 88, since this circuit is complete through relay switch 230. However, the closing of pressure switch 206 closes the circuit of the delayed action relay 198. The circuit of the delayed action relay is as follows: From main power line 240 through lead 250, relay switch 232, lead 280, the still closed holding circuit switch 230, lead 260, solenoid 54, lead 261, solenoid 50, lead 262, solenoid 106, lead 264, solenoid 52, lead 266, solenoid 88, and lead 268 to the other main power line 238. After an interval to assure that all of the foreign matter and unfiltered liquid have been evacuated from filter chamber 60, the delayed action relay 198 operates to close switch 222. The closing of switch 222 energizes relay 204, the circuit of which is as follows: From main power line 240 through lead 282, switch 222, lead 284, limit switch 190, lead 286, the coil of relay 204, and lead 288 to the other main line 238. The energizing of relay 204 opens switch 232 and closes switches 234 and 236. The opening of switch 232 breaks the circuit of the solenoids 54, 50, 106, 52 and 88 and as a consequence these solenoids return to their normal positions or positions they assume during filtering operation. When switch 232 opened, it deenergized relay 202 opening switch 230 and closing switch 228. The opening of switch 230 has no effect at this time since switch 232 is also open, but closing of switch 228 closes the circuit of the motor of pump 41. It will be understood, of course, that the return of solenoids 54, 50, 106, 52 and 88 to their normal positions and the starting of pump 41 occurs substantially simultaneously.

The aforementioned closing of relay switch 236 energizes the air pressure control solenoid 105 and the simultaneous closing of relay switch 234 establishes a holding circuit for relay 204. The circuit of the solenoid 105 is as follows: From the main power line 240 through lead 300, solenoid 105, lead 302, switch 224, lead 304, lead 306, the now closed relay switch 236 and lead 308 to the other main power line 238. The holding circuit established by the closing of relay switch 234 is as follows: From the main power line 240, through leads 282, 292, the now closed relay switch 234, leads 290, 284, limit switch 190, lead 286, the coil of relay 204 and through lead 288 to the other main power line 238.

The energizing of the solenoid 105 opens the valve thereof to permit compressed air to enter and pressurize the filter chamber 102 to force the liquid through the filter 132 into the drain chamber 104. Pressurizing the filter chamber 102 opens the pressure responsive switch 214 to keep the circuit of the delayed action control 200 open. When substantially all of the liquid has been forced from the filter chamber 102 into the drain chamber 104, the pressure in the chamber 102 has decreased such that pressure switch 214 closes and energizes the delayed action relay 200. The circuit of relay 200 is as follows: From the main power line 240, through leads 282, 292, the still closed switch 234, leads 290, 284, limit switch 190, leads 286, 298, the now closed pressure switch 214, lead 296, the coil of delayed action relay 200 and through lead 294 to the other main power line 238. The relay 200 after an interval acts to open its switch 224 and close switch 226. The opening of switch 224 deenergizes solenoid 105 to discontinue flow of compressed air into chamber 102. The closing of relay switch 226 closes the circuit of the solenoid 140 that controls the power element 134. The circuit of the solenoid 140 is as follows: From the main power line 240 through lead 312, solenoid 140, lead 310, the now closed switch 226, lead 306, the still closed relay switch 236, and through lead 308 to the other main power line 238. The power element 134 now acts to move the lower section 100 of container 94 preparatory to removal of the foreign matter from the container. As the section 100 starts moving down it releases switch 188 which opens to break the holding circuit of relay 202, deenergizing the relay approaching its fully open position the section 100 allows switch 182 to close. The closing of switch 182 closing the circuit of the conveyor motor 178 which then drives the conveyor 26. When all of the foreign matter has been removed from container 94, one of the cams 192 on the conveyor chain engages and opens limit switch 190 which breaks the holding circuit of relay 204, thus stopping the conveyor motor 178. The deenergizing of relay 204 opens relay switch 236 which deenergizes the solenoid 140 of the power element 134 which then acts to move the lower section 100 of container 94 upward to closed position. As the section 100 moves upward, it opens motor switch 182 and closes switch 188. The filter 24 is now ready to receive the next discharge of foreign matter and unfiltered liquid from the filter 22.

From the foregoing description, it should now be appreciated that I have provided a new and improved liquid filter apparatus of the type having a relatively long filtering operation and a relatively short filter clean-out operation. In this connection it will be understood that the filtering operation is only shut down for the relatively short time that it requires to force all of the foreign matter and unfiltered liquid out of the filter head. By discharging the foreign matter and unfiltered liquid from the primary to the secondary filter, operation of the primary is resumed without any appreciable loss of filtering time, and removal of the foreign matter from the secondary filter is accomplished after resumption of operation of the primary filter. The foreign matter is removed from the secondary filter and the unfiltered liquid is saved and returned to the primary filter before it is again time for discharge of the primary filter into the secondary. In addition, it will be seen that I have provided for automatic cycling of both filters between filtering and cleaning operations and that the cleaning out operations are both initiated upon increase in pressure in the primary filter to a pressure indicative of undesirable clogging of the primary filter.

While I have shown and described my invention in considerable detail, it will be understood that the invention is to be limited only by the scope of the appended claims.

What I claim is:

1. In a filter apparatus, a sludge disposal unit including separable container sections, means movable between said sections to remove the sludge therefrom after the sections have been separated, normally inactive power means operable to separate said sections, control means operatively connected to activate said sludge removing means and initiated by the separating movement of said sections, a delayed action control operatively connected to activate said power means, a pressure filter having a sludge outlet in communication with said container, a normally closed valve controlling said sludge outlet, and a control responsive to a predetermined increase in pressure in said filter and operatively connected to effect both the opening of said sludge outlet valve and activation of said delayed action control.

2. In a liquid filter apparatus, a pair of upper and lower separable container sections normally cooperable to form a closed container, power means operable to separate said sections, the lower one of said sections having an inlet for sludge and contaminated liquid and having an outlet for the filtrate, a filter media member disposed between said sections, a second member associated with said filter media member, one of said members movable through said container between said sections to remove sludge therefrom after said sections have been separated, means operable to move said one member and operatively connected for activation by the separation movement of said sections, normally inactive means operable to effect a differential pressure on opposite sides of said filter media to force liquid from the sludge through said media to said outlet, a filter having a sludge outlet in communication with said inlet of said container, a normally closed valve controlling said sludge outlet, a control responsive to a clogged condition of said filter to open said valve and operatively connected to initiate operation of said normally inactive means, and a control responsive to a predetermined decrease in pressure in said container as the liquid is evacuated therefrom and operatively connected to initiate operation of said power means and also deactivate said normally inactive means.

3. In a liquid filter apparatus, an upper stationary container section having a top wall, a lower container section forming a container with the upper section and movable to a position in spaced apart relationship to said upper section, said lower section having an outlet, a filter media extending through said container between said sections and movable when said sections are in spaced apart relationship to remove sludge from the container, means operable to move said lower section to said position, delayed action means controlling activation of said moving means, means operable to move said filter media and activated by movement of said lower section to said position, a filter mounted on the top wall of said container and extending downwardly thereinto having a sludge outlet, an inlet to said filter for contaminated liquid, an outlet from said filter for filtrate, a compressed air inlet to said filter, a normally open valve controlling said inlet, a normally open valve controlling said filtrate outlet, a normally closed valve controlling said sludge outlet, a normally closed valve controlling said compressed air inlet, said valves reversible, a pump operable to supply contaminated liquid to said inlet and maintain a pressure in said filter in excess of atmospheric pressure, a filter media separating the contaminated fluid inlet and the sludge outlet from the filtrate outlet and the compressed air inlet, and a control responsive to a predetermined increase in pressure in said filter to reverse said valves and simultaneously therewith initiate operation of said delayed action control.

References Cited in the file of this patent

UNITED STATES PATENTS

| 826,390 | Van Law | July 17, 1906 |
| 920,909 | Brewer | May 11, 1909 |
| 2,152,900 | Manning | Apr. 4, 1939 |
| 2,303,262 | Dunmire | Nov. 24, 1942 |
| 2,366,903 | Harms | Jan. 9, 1945 |
| 2,494,534 | Armstrong | Jan. 17, 1950 |
| 2,828,862 | Johnson | Apr. 1, 1958 |